United States Patent [19]
Smith

[11] 3,953,967
[45] May 4, 1976

[54] SERVOED THROTTLE VALVE FOR FUEL CONTROLS

[75] Inventor: Lawrence S. Smith, Simsbury, Conn.

[73] Assignee: United Technologies Corporation, Hartford, Conn.

[22] Filed: Mar. 18, 1975

[21] Appl. No.: 559,477

[52] U.S. Cl. ............................................ 60/39.28 R
[51] Int. Cl.² ............................................ F02C 9/10
[58] Field of Search ...... 60/39.27, 39.28 R, 39.28 T

[56] References Cited
UNITED STATES PATENTS

| | | | |
|---|---|---|---|
| 3,091,080 | 5/1963 | Crim | 60/39.27 X |
| 3,187,505 | 6/1965 | Plummer | 60/39.28 R |
| 3,230,709 | 1/1966 | Turner | 60/39.28 R |
| 3,348,375 | 10/1967 | Gardner | 60/39.28 R |
| 3,513,899 | 5/1970 | Paduch | 60/39.27 |

*Primary Examiner*—Clarence R. Gordon
*Attorney, Agent, or Firm*—John D. Del Ponti

[57] ABSTRACT

For a fuel control for a turbine type of power plant a throttle valve servo piston combination including a servo control valve operated off of a multiplication lever system wherein said throttle valve servo piston combination is rotated resulting in a smaller unit and achieving a reduction in its size and that of the control valve and lever system. A gear secured to the rotatably supported mechanism is located in a judiciously selected position within the drain portion of the control and the maximum fuel flow limit changes the feedback system from a force balance one to a position one during maximum limiting.

9 Claims, 1 Drawing Figure

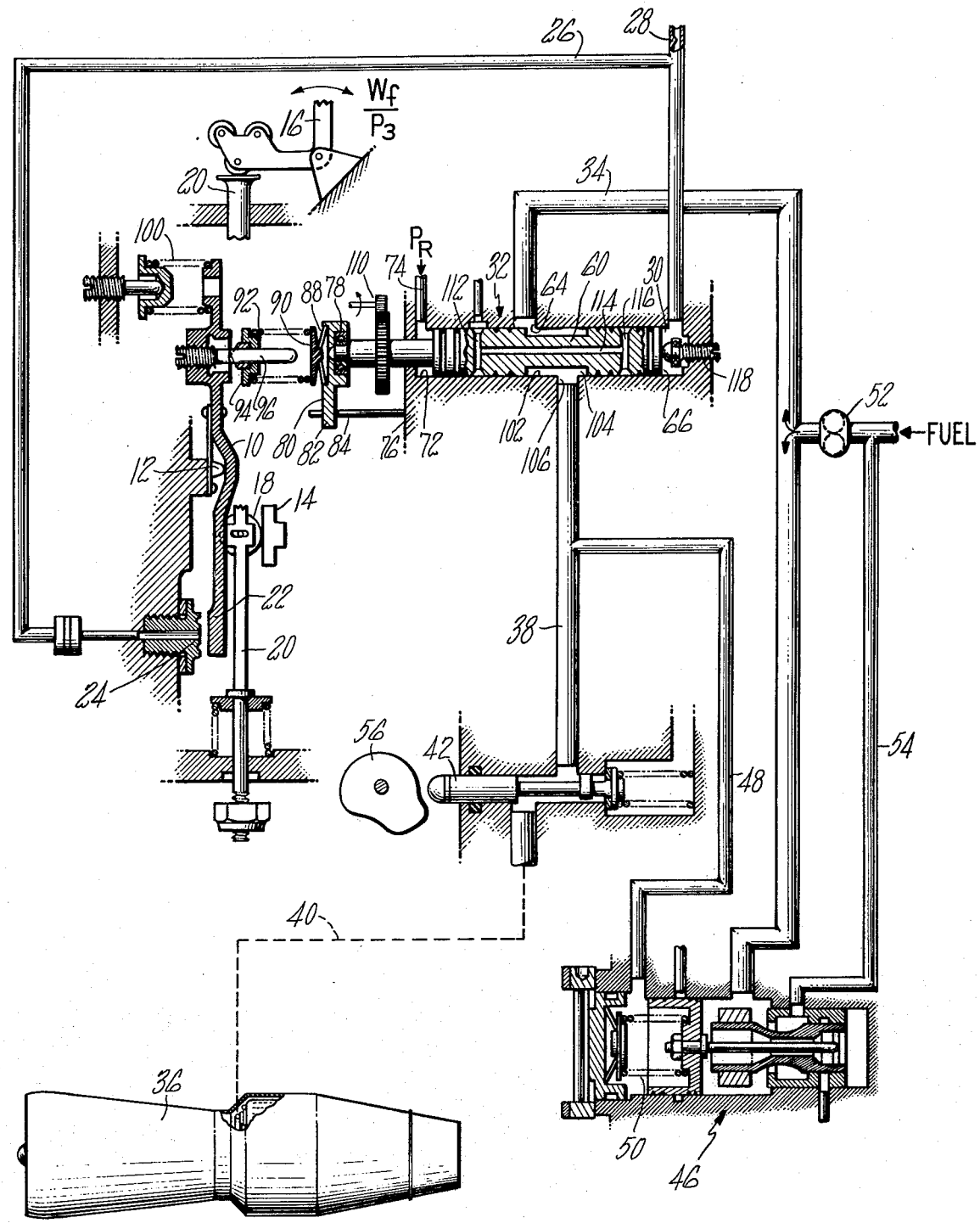

SERVOED THROTTLE VALVE FOR FUEL CONTROLS

BACKGROUND OF THE INVENTION

This invention relates to fuel controls for gas turbine types of power plant and particularly to an improved throttle valve, its servo system and its multiplication linkage system.

This invention constitutes an improvement over the type of fuel control exemplified by, for example, the JFC-25, JFC-60 manufactured by the Hamilton Standard Division of United Aircraft Corporation and the type disclosed in U.S. Pat. No. 2,822,666 granted to S. G. Best on Feb. 11, 1958 and assigned to the same assignee. As is well known the throttle valve utilized in the above mentioned controls are all of the type that is servoed and it together with its associated mechanism and the multiplying linkage are considered relatively large and consequently heavy.

Conventionally, the throttle valve, which serves to meter fuel flow to the burner section of the power plant, is positioned in response to the multiplicand of $W_f/P_3 \times P_3$ where $W_f$ equals fuel flow in pounds per hour and $P_3$ is compressor discharge pressure in pounds per square inch. Also, conventionally the $W_f/P_3$ signal is scheduled and is manifested in a linkage position relative to a fulcrumed lever and $P_3$ is manifested as a force applied to that linkage so that the moment arm on the fulcrumed lever is manifested as the input to the servo system for positioning the throttle valve. Essentially, the fulcrumed lever establishes the curtain area of the jet nozzle which, in turn, controls flow and pressure to the servo piston for positioning the throttle valve. A force balance feedback system nulls the servo in a conventional manner.

I have found that I can reduce the size of the hydraulic piston of the servo system, hence the size of the throttle valve, which in turn, results in a reduction of size in the overall multiplication, feedback and servo systems, without sacrificing accuracy by including means, judiciously located, to rotate the piston, throttle valve combination. While, it is known that pilot valves, for example, are rotated in order to overcome stiction (static friction) problems, such never manifested a reduction in size and weight. Because of the problems inherent with rotating valves, it was understood by those skilled in the art that the inclusion of the rotating mechanism would not result in a weight reduction, but in fact, would result in a weight increase. To the contrary, I was able to not only reduce the overall weight significantly, but in fact, increased the accuracy of the metering system.

It is conventional in the heretofore known fuel controls of the type that utilizes a flapper type of servo control valve to include compensating means to compensate for the change in impact forces on the fulcrumed lever resulting from the flow egressing from the flapper nozzle at different curtain areas because of the changes in pressure of the fluid in the nozzle. This hardware such as bellows, levers, additional flow lines, etc. to achieve this compensation is completely eliminated by virtue of this invention.

According to this invention the maximum fuel flow limiter which serves to limit the maximum amount of fuel that the fuel control can meter to the engine changes the feedback system from a force balance to a position feedback and utilizes the flapper and servo system directly requiring a smaller load in comparison to the prior art system and realizing a reduction in size and weight of these elements.

Additionally, by virtue of this invention I found that I could significantly improve the response time from the time a command signal was initiated until the output was manifested. In the case of weight reduction, it was found that the portion of the fuel control attributable to the metering and multiplication system at least a 30% savings was realized and in the case of time responsiveness an improvement of at least 50% was attained.

SUMMARY OF THE INVENTION

An object of this invention is to provide an improved fuel control for a gas turbine type of power plant.

A still further object of this invention is to provide for a fuel control of the type described, means for reducing the size of the throttle valve, multiplication leverage systems and its attendant servo mechanism, with a consequential reduction in weight and improvement in time responsiveness.

A still further object of this invention is to provide for a fuel control of the type described judiciously located means for imparting rotary motion to the throttle valve servo piston combination. Additionally, means are provided to assure that foreign matter indigenous to the fuel being metered thereby is prevented from interfering with the rotary mechanism.

Other features and advantages will be apparent from the specification and claims and from the accompanying drawings which illustrate an embodiment of the invention.

BRIEF DESCRIPTION OF THE DRAWINGS

The sole FIGURE is a view partly in section and partly in schematic illustrating the details of this invention.

DESCRIPTION OF THE PREFERRED EMBODIMENT

The representation of a fuel control in the sole FIGURE depicting the inventive concept merely shows that portion of a fuel control necessary for an understanding of the invention and as one skilled in the art will appreciate this portion is typically housed within a casting housing the other control elements. This invention is particularly directed to the types of fuel controls such as the JFC-25, JFC-60, supra which are based on the $W_f/P_3 \times P_3$ principle and utilize a fulcrumed lever multiplication system for positioning a servoed throttle valve. As is well understood $W_f/P_3$ is scheduled as a function of compressor speed which may or may not be biased by another engine operating parameter for steady state engine operation and as a function of compressor speed and compressor inlet temperature for accelerating conditions.

As can be seen from the sole FIGURE, the fulcrumed lever 10, pivotable about pivot 12, responds to compressor discharge pressure input as a force via platen 14 and the scheduled $W_f/P_3$ signal via the bell crank 16 that positions rollers attached to rod 20. Essentially, the position of rollers 18 relative to the fulcrum and the force imparted by platen 14, results in a moment arm which is the multiplicand obtained by the multiplication of $W_f/P_3 \times P_3$. Any force unbalance in fulcrumed lever 10 will result in a displacement of the flapper valve 22 at the end thereof which establishes the curtain area of nozzle 24. This area in turn controls the flow in servo line 26 which communicates regulated servo fluid which is filtered fuel whose pressure is regulated in any well known manner (not shown) and which flow is now diverted to chamber 30 repositioning valve 60. It is apparent from the foregoing that the flow into chamber 30 is controlled by flapper 22 which in turn, is the multiplicand of $W_f/P_3 \times P_3$ or $W_f$.

Throttle valve 32, accordingly, is positioned to meter fuel accepted from line 34, to the engine 36 via lines 38 and 40 and shut-off valve 42.

Pressure regulating valve 46, which may take the form of any suitable conventional types, serves to maintain the pressure drop across throttle valve 32 constant. Suffice it to say that pressure regulating valve 46 measures the pressure upstream of throttle valve 32 via line 34 and the pressure downstream via line 48 and holds the pressure drop to the value of spring 50 by bypassing the excess flow to inlet of pump 52 via line 54.

As is shown in the embodiment, it is typical to employ a shut off valve downstream of the throttle valve which is directly actuated by the pilot's lever situated in the cockpit of the aircraft. Thus, valve 42, which is normally spring biased opened is positioned to close by movement of cam 56 which is directly coupled to the pilot's lever. As noted, land 58, now in the sealed position, is unseated when valve 42 closes to communicate line 38 with drain and ultimately to the inlet of pump 52.

What has been described above is typical in the fuel control art as exemplified by the fuel controls JFC-25, and JFC-60, supra. The following description is directed to the improvement of these fuel controls which as a consequence has proven to be smaller, lighter in weight and having an improved time constant, without sacrificing accuracy and reliability. As noted in this embodiment the throttle valve 32 comprises half area piston 60 having a metering land 62 disposed adjacent port 64 intermediate its ends. The full area end 66 is disposed in chamber 30 and the opposing end 70 which is half the effective area of end 66 is disposed in chamber 72. High or servo pressure ($P_R$) is continuously applied to chamber 72 via line 74 and as mentioned above controlled pressure is applied to chamber 30. Piston 60 extends beyond end closure 76 and is rotary supported at its end by ball bearing 78 secured to spring retainer 80. Retainer 80 carries extension arm 82 bearing against rod-like element 84 which prevents it from rotating without interfering with its axial movement.

Displacement of piston 60 is transmitted to fulcrumed lever 10 thru retainer 80 via bi-metal disc 88, spring retainer 90, spring 92 and spring retainer 94. The top face 96 of spring retainer 90 is formed into a knife edge and is urged against the fulcrumed lever 10. This serves as a feedback force to the force balanced fulcrum lever 10.

As is apparent from the foregoing fulcrumed lever 10 is subjected to the force of the fluid egressing from nozzle 24, the force evidenced by rollers 18, the feedback force, just described, and the force of spring assembly 100 which is adjustable to balance and index the lever. Heretofore, in the prior art systems the force required to position the throttle valve was significant and this was reflected in the flapper nozzle of the servo system. Hence the impact forces of the fluid egressing from the flapper nozzle varied significantly by virtue of the change in pressure of the servo fluid. Thus the prior art necessitated compensating means in the form of additional hardware to compensate for the change in forces. However, by virtue of this invention the force change occasioned by the servo fluid egressing from flapper nozzle 24 is substantially eliminated since the throttle valve movement requires virtually no pressure change.

Piston 60 which is cylindrical in shape is disposed in cylinder 102 and the integral metering valve formed by land 62 is particularly located so that metered fuel is conducted to line 38 via annular passage 104 and port 106, it being noted that all fuel flow occurs intermediate the ends of piston 10. Gear 108 is suitably driven at some reduced speed by the engine via drive gear 110 and shaft 112 and continuously rotates piston 60. Obviously the width of the mating teeth are sufficiently dimensioned that they are always in engagement notwithstanding displacement of piston 60.

As is noted in the sole FIGURE, gear 108 is disposed intermediate the ends of piston 60 adjacent the half area end and in the drain cavity of the fuel control casing.

Unregulated high pressure fuel which is filtered and which is higher in value than the pressure of the fuel in annular passage 104 is admitted into drilled passages 112, 114 and 116 so that there is a positive flow of this fuel between the sliding surfaces of piston 60 and its cylinder into annular passage 102 so as to assure that the fuel being metered to the engine which may have foreign matter does not flow adjacent these sliding surfaces and deposit foreign matter thereon.

A minimum fuel adjustment 118 may be provided to limit the displacement of piston 60. Adjustable maximum fuel stop 119 serves to limit the fuel flow to the engine by limiting the displacement of throttle valve 60. Hence when throttle valve 60 reaches its maximum upward stroke it bears against stop 119 which directly positions fulcrumed lever 10 and by rotating it counterclockwise to reposition throttle valve 60 downwardly to close metering land 62 and hence reduce fuel flow. It will be appreciated that since the motion of piston 60 is directly transmitted to fulcrumed lever 10 through stop 119, spring 92 is rendered inoperative and the feedback is changed from a force balance type to a position type.

In operation, a $W_f/P_3$ input, be it steady-state, acceleration, deceleration, etc. is transmitted to rollers 18 where it is multiplied by actual $P_3$ seen as a force on platen 14. Any unbalance of forces on fulcrumed lever 10 cause it to rotate clockwise or counterclockwise depending on the polarity of the input signal. A call for more fuel flow would result in a clockwise movement of fulcrumed lever 10, reducing the curtain area of flapper 22, reducing flow in line 26, thereby diverting it to chamber 30 forcing piston 60 leftwardly. Obviously this opens land 62 to increase fuel flow.

The counterclockwise movement of fulcrumed lever 10 results in a movement of piston 60 rightwardly to reduce the metering area of land 62. Movement in either direction of piston 60 obviously changes the height of spring 92 which imparts a new force to fulcrumed lever 10, which feedback force returns the fulcrumed lever and hence flapper to the null position.

By virtue of the continuous rotation of piston 60, the maximum flow stop, the integral construction of the throttle valve and piston 60 and the location of the gear a smaller, lighter and improved fuel control is realized.

It should be understood that the invention is not limited to the particular embodiments shown and described herein, but that various changes and modifications may be made without departing from the spirit or scope of this novel concept as defined by the following claims.

I claim:
1. For a fuel control for a turbine type of power plant, in combination, a force balance multiplication linkage system for multiplying two parameters so that the multiplicand is a function of desired fuel flow, said multiplication linkage system including a pivotally mounted fulcrumed lever, a positional linkage member slidably mounted relative to said fulcrumed lever, a servo system including a flapper valve whose curtain area is established by said fulcrumed lever determined by said positional linkage member during transient conditions, a combined piston and metering valve operatively connected to said flapper valve for being positioned thereby, said metering valve having a spool element with a metering orifice rotatably supported in a cylinder, and having one end spaced from said fulcrumed lever extending through said cylinder, resilient means interposed between the end of said one end and a portion of said fulcrumed lever to null said flapper valve for nontransient conditions and driving means secured to said one end for imparting rotational movement to said spool element whereby the pressure in said flapper remains substantially constant during said transient conditions.

2. For a fuel control as claimed in claim 1 wherein said spool element having opposing reaction surfaces wherein said element extending from said spool element is sized so that the effective area of said reaction surface adjacent thereto is substantially half the area of the other reaction surface and is constantly subjected to pressurized fluid, the fluid adjacent the other reaction surface being controlled by said flapper valve.

3. For a fuel control as claimed in claim 2 wherein said resilient means is a coiled spring having one end bearing against said fulcrumed lever and the other end against said one end, a spring retainer having bearing means supporting said one end supporting said spring and including an extension member preventing rotation of said spring retainer but permitting rectilinear movement thereof.

4. For a fuel control as claimed in claim 3 having means including drilled passages in said spool element communicating with fluid whose pressure is higher than the pressure in said metering orifice to lead said fluid between the contact surfaces of said combined piston and metering valve to said metering orifice.

5. A fuel control for a turbine type of power plant in which at least two parameters are sensed and multiplied, said fuel control having a force balance multiplying lever system including a fulcrumed lever and a lever slidably mounted relative to said fulcrumed lever, a servo system including a flapper valve, and a combined piston and metering valve being positioned rectilinearly thereby to meter fuel to said power plant, the curtain area of said flapper valve being established by said fulcrumed lever during a transient condition, a force feedback means interconnecting said fulcrumed lever and said combined piston and metering valve to null said fulcrumed lever in the nontransient condition, means on said fulcrumed lever operatively connected to said combined piston and metering valve solely when said metering valve is in its maximum fuel open position to change said force feedback means to a position feedback means in combination with means for imparting continuous rotary movement to said combined piston and metering valve.

6. A fuel control as claimed in claim 5 including a depending rod extending from said fulcrumed lever and normally spaced from said combined piston and metering valve and abutting thereagainst for maximum fuel flow limiting.

7. For a fuel control for a turbine type power plant in which fuel is scheduled by multiplying $W_f/P_3$ by $P_3$ (where $W_f/P_3$ is a ratio unit established by certain engine operating parameters and $P_3$ is actual compressor discharge pressure or a function thereof) a force balance multiplication lever system including a fulcrumed lever and a positional lever slidably mounted relative thereto, a servo system including a flapper valve operatively connected to said multiplication lever system for controlling a metering valve for controlling fuel flow to said power plant, the improvement comprising means for maintaining the pressure in said flapper valve constant, said means including combined piston and metering valve having a spool element rotatably mounted in a cylinder adjacent a drain cavity and having opposite faces being fluid reaction surfaces, said flapper adjusting the flow of servo fluid adjacent one of said reaction surfaces for positioning said combined piston and metering valve rectilinearly, and means disposed in said drain cavity portion remote from said one of said reaction surfaces for imparting rotary motion to said combined piston and metering valve.

8. For a fuel control as claimed in claim 7 including a force feedback system interconnecting said combined piston and metering valve and means for rendering said force feedback system inoperative at a predetermined position of said combined piston and metering valve and changing it to a position feedback.

9. A fuel control as claimed in claim 8 wherein said feedback rendering means includes a depending arm on said fulcrumed lever spaced a predetermined distance relative to the metering area of said combined piston and metering valve.

* * * * *